United States Patent
Youn et al.

(10) Patent No.: US 6,382,048 B1
(45) Date of Patent: May 7, 2002

(54) SELF-ADJUSTABLE CABLE TENSIONING DEVICE FOR PARKING BRAKE OF MOTOR VEHICLE

(75) Inventors: Sug-Jun Youn; Gil-Young Jung, both of Gyeongsan (KR)

(73) Assignee: Samlip Industrial Co., Ltd., Daegu (KR)

(*) Notice: Subject to any disclaimer, the term of this patent is extended or adjusted under 35 U.S.C. 154(b) by 0 days.

(21) Appl. No.: 09/704,580

(22) Filed: Nov. 3, 2000

(30) Foreign Application Priority Data

Aug. 16, 2000 (KR) ........................... 2000-47083

(51) Int. Cl.[7] ................................. G05G 5/06
(52) U.S. Cl. ..................... 74/529; 74/535; 74/538
(58) Field of Search .................... 74/529, 523, 527, 74/531, 532, 545, 501.5 R, 501.6, 535, 538; 192/45, 47, 111 A; 188/79.51, 79.54, 79.55, 79.56, 79.62, 196 F, 196 P, 196 D, 199

(56) References Cited

U.S. PATENT DOCUMENTS

| | | | |
|---|---|---|---|
| 4,762,332 A | * 8/1988 | Seol | 280/250.1 |
| 5,272,935 A | 12/1993 | Heinemann et al. | 74/523 |
| 5,448,928 A | 9/1995 | Harger | 74/523 |
| 5,547,055 A | * 8/1996 | Chang et al. | 192/45 |
| 6,282,980 B1 | * 9/2001 | Sykes | 74/528 |

* cited by examiner

*Primary Examiner*—David A. Bucci
*Assistant Examiner*—Justin Stefanon
(74) *Attorney, Agent, or Firm*—Birch, Stewart, Kolasch & Birch, LLP

(57) ABSTRACT

Disclosed is a self-adjustable cable tensioning device for a parking brake of a motor vehicle. The device comprises a mounting bracket having an engaging pin; a hand lever mounted to the mounting bracket to be moved between a brake-applied position and a brake-released position; a detaining plate secured to the hand lever; a rotating plate fitted around the detaining plate such that the rotating plate can be rotated along with or independently of the detaining plate, the rotating plate having a cable guide bracket, the detaining plate and the rotating plate cooperating with each other to define therebetween actuating chambers each of which is gradually narrowed in a clockwise direction; rollers inserted into the actuating chambers such that the rollers can be locked into and unlocked from narrowed parts of the actuating chambers, respectively; an actuating plate for locking and unlocking the rollers into and from the narrowed parts of the actuating chambers, the actuating plate being engaged with the engaging pin of the mounting bracket immediately before the hand lever reaches the brake-released position, to allow the rollers to be unlocked from the narrowed parts; a spring for biasing the actuating plate in the clockwise direction; and a take-up spring for biasing the cable guide bracket in a counterclockwise direction.

1 Claim, 3 Drawing Sheets

[Fig. 1]
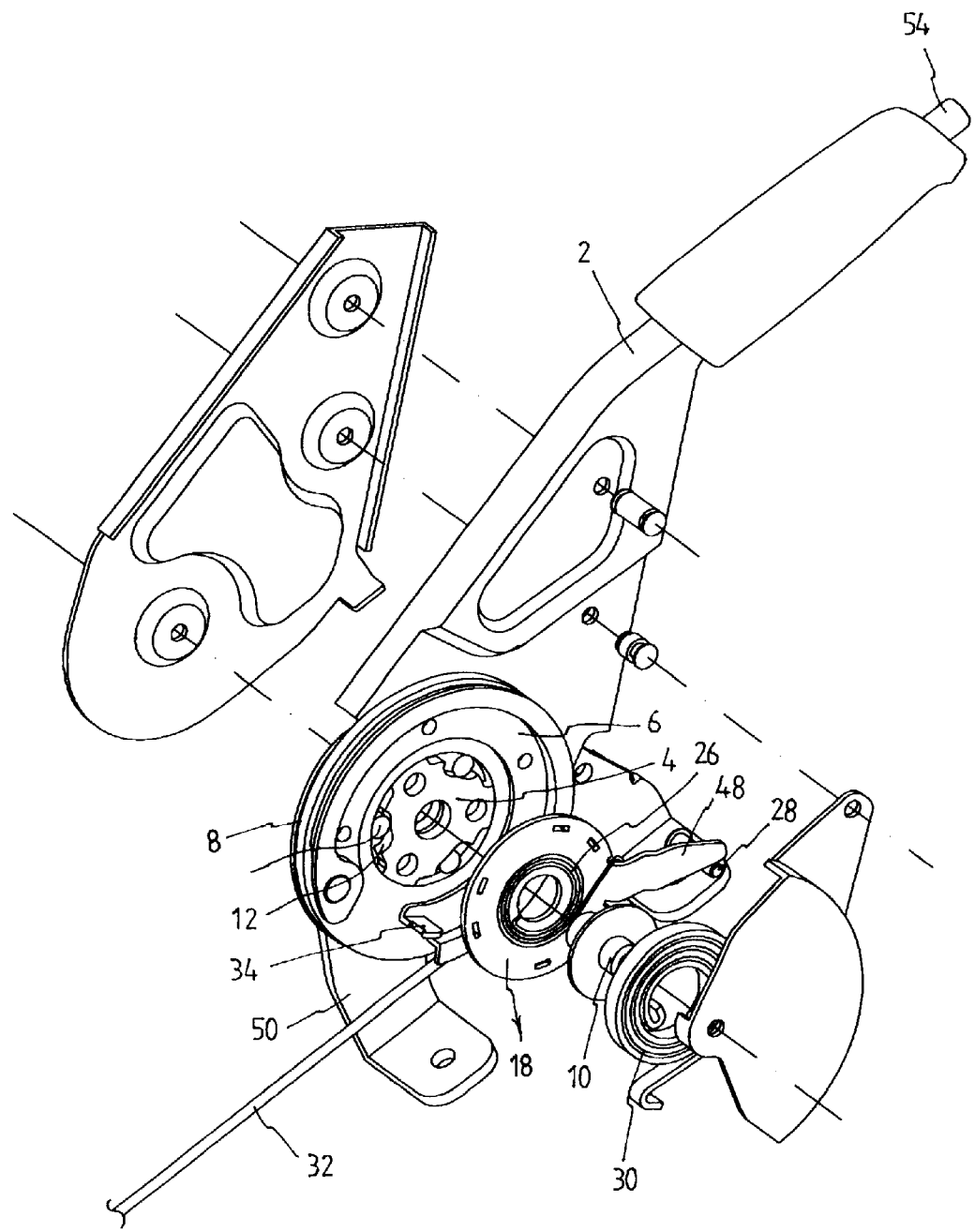

[Fig. 2]
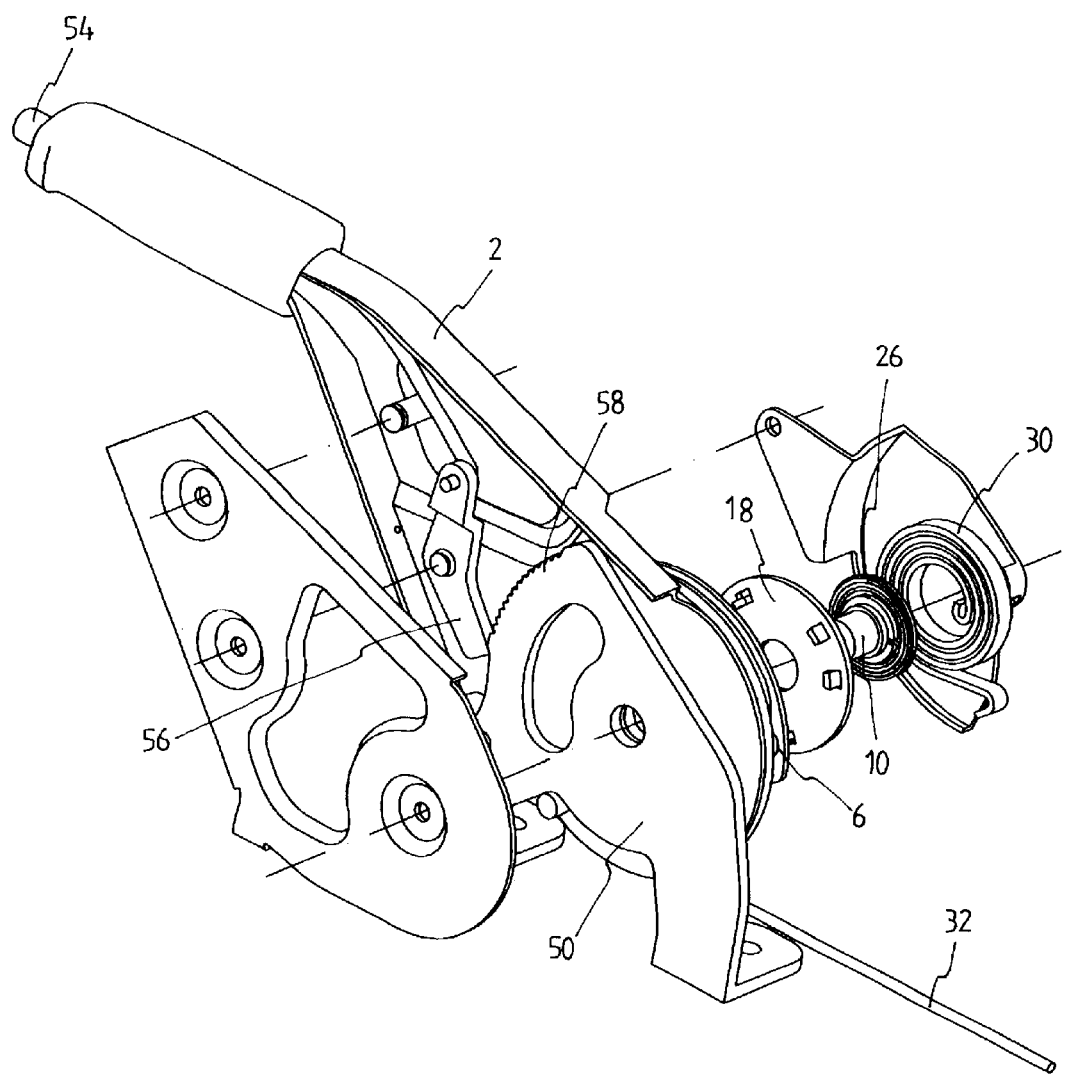

[Fig. 3]
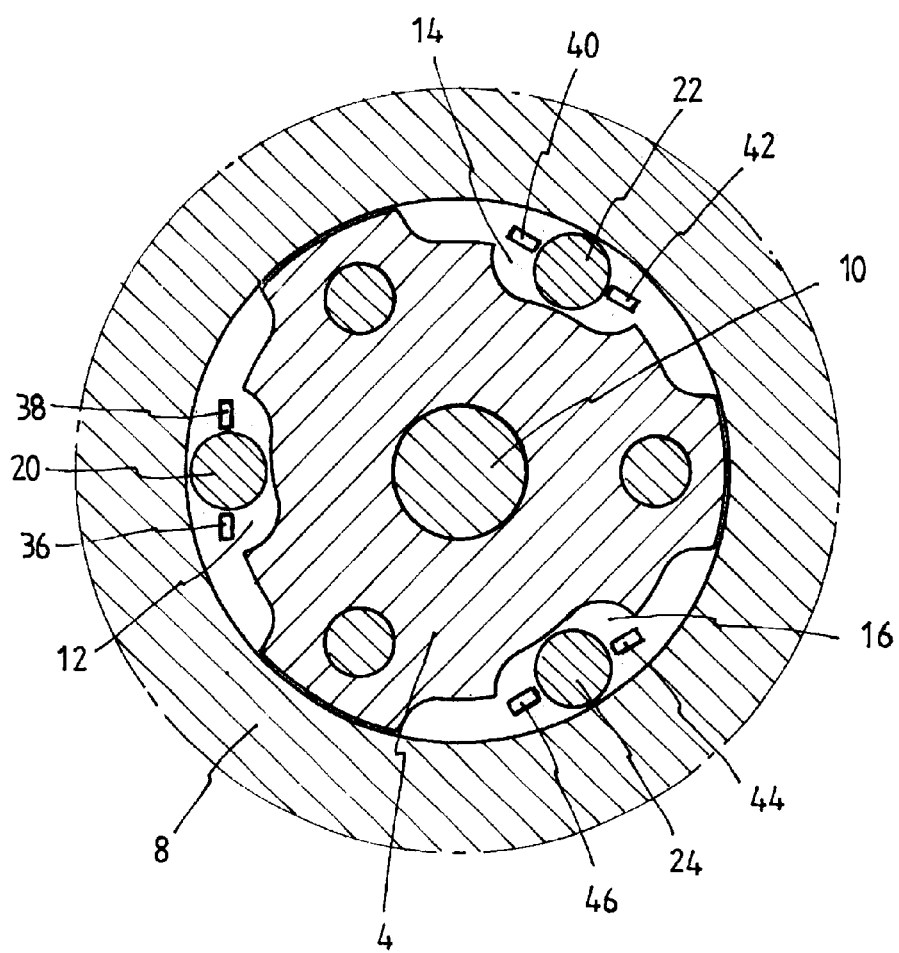

SELF-ADJUSTABLE CABLE TENSIONING DEVICE FOR PARKING BRAKE OF MOTOR VEHICLE

BACKGROUND OF THE INVENTION

1. Field of the Invention

The present invention relates to a self-adjustable cable tensioning device for removing slack from a cable used in a parking brake of a motor vehicle.

2. Description of the Related Art

As typical examples of a device for self-adjusting a length of a cable in a parking brake of a motor vehicle, a hand brake with an adjusting device for a motor vehicle is disclosed in U.S. Pat. No. 5,272,935, and a variable ratio parking brake lever with self-adjust cable tensioning means is disclosed in U.S. Pat. No. 5,448,928. In these examples, as a pawl is disengaged from ratchet teeth formed on a circumferential outer surface of a rotating plate, the rotating plate is rotated by means of a take-up spring so as to take up a cable thereon by a slacked length thereby to self-adjustably maintain the cable in an adequately tensioned status.

However, the conventional devices constructed as mentioned above suffer from defects in that, when the pawl is engaged with and disengaged from the ratchet teeth, noise is generated, and, since this noise is provoked independently of skillfulness of a driver, uncomfortableness is caused to the driver in the course of manipulating the hand brake or the parking brake lever. Also, because ineffective tensioning stroke of the rotating plate can be induced at the maximum by a pitch of a ratchet tooth, it is difficult to precisely tension the cable by the slacked length, whereby it is impossible to hold a constant braking point.

SUMMARY OF THE INVENTION

Accordingly, the present invention has been made in an effort to solve the problems occurring in the related art, and an object of the present invention is to provide a self-adjustable cable tensioning device for a parking brake of a motor vehicle, which does not generate noise when removing slack from a cable, and can precisely maintain the cable in an adequately tensioned status without experiencing ineffective tensioning stroke.

In order to achieve the above object, according to the present invention, there is provided a self-adjustable cable tensioning device for a parking brake of a motor vehicle. In the device, a mounting bracket is fastened to a body of the motor vehicle and has an engaging pin. A hand lever is pivotally mounted to the mounting bracket in such a way as to be moved between a brake-applied position and a brake-released position. A detaining plate is secured to a side of the hand lever. A rotating plate is fitted around the detaining plate in a manner such that the rotating plate can be rotated along with or independently of the detaining plate. The rotating plate has integrated therewith a cable guide bracket. The detaining plate and the rotating plate cooperate with each other to define therebetween a plurality of actuating chambers which are spaced apart one from another by a predetermined angle and each of which is gradually narrowed in a clockwise direction. A plurality of rollers are inserted into the plurality of actuating chambers in a manner such that the rollers can be locked into and unlocked from narrowed parts of the actuating chambers, respectively. The rollers are actuated by an actuating plate. A spring biases the actuating plate in the clockwise direction to maintain the rollers in a locked status when the hand lever is in the brake-applied position. The actuating plate is engaged with the engaging pin of the mounting bracket immediately before the hand lever reaches the brake-released position, thereby to allow the rollers to be unlocked from the narrowed parts of the actuating chambers, respectively. At a consequence, as the cable guide bracket which is integrated with the rotating plate, is rotated by a take-up spring, slack of a cable can be removed.

BRIEF DESCRIPTION OF THE DRAWINGS

The above objects, and other features and advantages of the present invention will become more apparent after a reading of the following detailed description when taken in conjunction with the drawings, in which:

FIG. 1 is a front exploded perspective view of a self-adjustable cable tensioning device for a parking brake of a motor vehicle, in accordance with an embodiment of the present invention;

FIG. 2 is a rear exploded perspective view of the self-adjustable cable tensioning device according to the present invention; and FIG. 3 is a cross-sectional view for explaining operations of the self-adjustable cable tensioning device according to the present invention.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a front exploded perspective view of a self-adjustable cable tensioning device for a parking brake of a motor vehicle, in accordance with an embodiment of the present invention. The self-adjustable cable tensioning device according to the present invention includes a hand lever 2 which is pivotally mounted to a mounting bracket 50 of the parking brake. The hand lever 2 can be pivoted about a rotation shaft 10 between a brake-applied position and a brake-released position. A detaining plate 4 is fixedly secured to a side of the hand lever 2. A rotating plate 8 which is integrated with a cable guide bracket 6, is fitted around the detaining plate 4 in a manner such that the rotating plate 8 can be rotated along with or independently of the detaining plate 4. A plurality of actuating chambers 12, 14 and 16 are defined between the detaining plate 4 and the rotating plate 8, in a manner such that the actuating chambers 12, 14 and 16 are spaced apart one from another by a predetermined angle and each of the actuating chambers 12, 14 and 16 is gradually narrowed in a clockwise direction when viewed on a plane of FIG. 1. A plurality of rollers 20, 22 and 24 are inserted into the plurality of actuating chambers 12, 14 and 16, respectively, in a manner such that the rollers 20, 22 and 24 can be locked into and unlocked from narrowed parts of the actuating chambers 12, 14 and 16, respectively. Each of the rollers 20, 22 and 24 has a predetermined diameter. The rollers 20, 22 and 24 are actuated by an actuating plate 18.

The actuating plate 18 is biased by a spring 26 in the clockwise direction. By this, the actuating plate 18 enables the rollers 20, 22 and 24 to be locked into the narrowed parts of the actuating chambers 12, 14 and 16, respectively, when the hand lever 2 is in the brake-applied position. In the case that the hand lever 2 is pivoted from the brake-applied position toward the brake-released position, the actuating plate 18 is engaged with an engaging pin 28 which is formed on the mounting bracket 50. Thereafter, the actuating plate 18 is maintained in a stopped status even though the hand lever 2 is continuously pivoted, and thereby, the rollers 20, 22 and 24 are moved out of the narrowed parts toward widened parts of the actuating chambers 12, 14 and 16 to be maintained in an unlocked status.

Due to unlocking of the rollers 20, 22 and 24, the cable guide bracket 6 which is freed from the detaining plate 4 which is secured to the hand lever 2, is rotated by a take-up spring 30 in a counterclockwise direction, and a cable 32 is taken up on the cable guide bracket 6, that is, the rotating plate 8, whereby slack of the cable 32 is removed.

FIG. 3 is a cross-sectional view for explaining operations of the self-adjustable cable tensioning device according to the present invention. A shaft hole is defined at a center portion of the detaining plate 4. A plurality of contoured grooves are defined on a circumferential outer surface of the detaining plate 4 in a manner such that the contoured grooves are spaced apart one from another by the predetermined angle and each contoured groove is gradually shallowed in the clockwise direction. The detaining plate 4 is secured to a side surface of the hand lever 2 so that the shaft hole is communicated with another shaft hole which is defined in a lever wall of the hand lever 2.

The rotating plate 8 which is integrated with the cable guide bracket 6, is defined with a circular opening in a manner such that the detaining plate 4 can be loosely fitted into the circular opening. Consequently, by the fact that the detaining plate 4 is loosely fitted into the circular opening, the plurality of actuating chambers 12, 14 and 16 which are gradually narrowed in the clockwise direction, are delimited by bottom surfaces of the contoured grooves and a circumferential inner surface of the rotating plate 8.

The cable guide bracket 6 which is integrated with the rotating plate 8, has a conventional structure in that the cable guide bracket 6 is defined with a circular guide groove where the cable 32 is wound around or unwound from the cable guide bracket 6. At a lower end of the cable guide bracket 6, there is projectedly formed an engaging projection 34 to which one end of the take-up spring 30 is connected.

Each of the rollers 20, 22 and 24 which are respectively inserted into the actuating chambers 12, 14 and 16 defined between the detaining plate 4 and the rotating plate 8, has a diameter which is no less than a radial distance of the narrowed part and no greater than a radial distance of the widened part of each of the actuating chambers 12, 14 and 16, whereby, as the rollers 20, 22 and 24 are moved in the actuating chambers 12, 14 and 16 by the actuating plate 18, locking and unlocking of the rollers 20, 22 and 24 into and from the narrowed parts of the actuating chambers 12, 14 and 16 are effected.

To this end, a plurality of pairs of protrusions 36, 38; 40, 42; and 44, 46 are formed on one surface of the actuating plate 18, in a manner such that each pair corresponds to each actuating chamber. Two protrusions which constitute each pair, are spaced apart from each other by a predetermined distance which is greater than the diameter of the rollers 20, 22 and 24. When the self-adjustable cable tensioning device according to the present invention is assembled, the rollers 20, 22 and 24 are loosely interposed between the pairs of protrusions 36, 38; 40, 42; and 44, 46 to be actuated thereby, respectively. As described above, by the fact that the actuating plate 18 is biased by the spring 26 in the clockwise direction, the rollers 20, 22 and 24 are locked into the narrowed parts of the actuating chambers 12, 14 and 16, respectively, when the hand lever 2 is in the brake-applied position. A supporting piece 48 is integrally formed on the other surface of the actuating plate 18 in a manner such that the supporting piece 48 extends in a radial direction and beyond a circumferential outer surface of the actuating plate 18. When the hand lever 2 is pivoted from the brake-applied position toward the brake-released position, the supporting piece 48 of the actuating plate 18 is engaged with the engaging pin 28 which is projectedly formed on the mounting bracket 50, immediately before the hand lever 2 reaches the brake-released position. Thereafter, the actuating plate 18 is maintained in the stopped status even though the hand lever 2 is continuously pivoted.

One end of the take-up spring 30 is connected to the engaging projection 34 which is projectedly formed at the lower end of the cable guide bracket 6, and the other end of the take-up spring 30 is connected to the rotation shaft 10. The take-up spring 30 functions to bias the cable guide bracket 6 in the counterclockwise direction to take up the cable 32 on the cable guide bracket 6, that is, the rotating plate 8.

FIG. 2 is a rear exploded perspective view of the self-adjustable cable tensioning device according to the present invention. The hand lever 2 is provided with a release button 54. The release button 54 is connected with a pawl 56 which is pivotally supported by a pivot pin on the lever wall of the hand lever 2. The mounting bracket 50 is formed with ratchet teeth 58. By the fact that the pawl 56 is engaged with the ratchet teeth 58, the hand lever 2 can be locked with respect to the mounting bracket 50. It is illustrated in the drawings that the self-adjustable cable tensioning device according to the present invention is applied to the conventional parking brake. In this regard, a person skilled in the art will readily recognize that the device according to the present invention does not impose any adverse influence on structures and operations of the conventional parking brake, and instead, additionally serves to pull a slacked cable when the hand lever 2 is moved from the brake-applied position to the brake-released position, thereby to self-adjustably tension the cable.

In the present invention, when parking the motor vehicle, if the hand lever 2 is pivoted about the rotation shaft 10 in the counterclockwise direction with the release button 54 pressed, the pawl 56 is disengaged from the ratchet teeth 58. At this time, the detaining plate 4 which is fixedly secured to the side of the hand lever 2, is integrally pivoted with the hand lever 2 about the rotation shaft 10 in the counterclockwise direction when viewed on the plane of FIG. 1. The rollers 20, 22 and 24 are locked into the narrowed parts of the actuating chambers 12, 14 and 16, respectively, by virtue of the actuating plate 18 which is biased by the spring 26 in the clockwise direction. Thereafter, the rotating plate 8 is integrally pivoted with the hand lever 2.

Hence, the cable guide bracket 6 which is integrated with the rotating plate 8, is also pivoted in the counterclockwise direction to take up the cable 32 thereon, whereby braking by the parking brake is fulfilled. Then, when pressure which is exerted on the release button 54, is removed, as the pawl 56 is engaged with the ratchet teeth 58, the hand lever 2 is fixedly maintained relative to the mounting bracket 50.

In this brake-applied position, if the release button 54 is pressed again, as the pawl 56 is disengaged again from the ratchet teeth 58, the hand lever 2 can be pivoted in the clockwise direction. When the hand lever 2 is pivoted in the clockwise direction, the cable 32 is unwound from the cable guide bracket 6, whereby the braked status of the parking brake is released.

In the course of releasing the braked status of the parking brake through pivoting movement of the hand lever 2, if the hand lever 2 is pivoted by a predetermined angle, the supporting piece 48 which is integrally formed on the other surface of the actuating plate 18, is engaged with the engaging pin 28 which is projectedly formed on the mounting bracket 50, whereby the actuating plate 18 cannot be rotated any more and is held stopped along with the rollers 20, 22 and 24.

Thereupon, by continuous rotation of the hand lever 2, the rollers 20, 22 and 24 are unlocked from the narrowed parts and moved toward the widened parts of the actuating chambers 12, 14 and 16, respectively. By this, the cable guide bracket 6 which is integrated with the rotating plate 8, is freed from the hand lever 2, and at the same time with this, the cable guide bracket 6 is rotated in the counterclockwise direction by elastic force of the take-up spring 30, independently of the detaining plate 4 which is fixedly secured to the side of the lever wall of the hand lever 2 to remove slack from the cable 32, whereby the cable 32 can be maintained in an adequately tensioned status.

Therefore, while not adversely affecting the basic construction of the conventional parking brake, the self-adjustable cable tensioning device according to the present invention can be applied to the conventional parking brake which is configured in a manner such that a brake-applying operation and a brake-releasing operation can be implemented with pivoting movement of a hand lever about a rotating shaft.

As a result, the self-adjustable cable tensioning device according to the present invention, constructed as mentioned above, affords advantages in that, as a driver pivots a hand lever from a brake-applied position toward a brake-released position so as to run a motor vehicle, rollers which are maintained in a locked status at the brake-applied position, are unlocked immediately before the hand lever reaches the brake-released position, and a cable guide bracket which is freed from a detaining plate by virtue of unlocking of the rollers, is rotated by a take-up spring thereby to self-adjustably and precisely maintain a cable in an adequately tensioned status, whereby noise is not generated when removing slack from the cable, in such a way as not to cause uncomfortableness to the driver, and it is possible to hold a constant braking point through pulling the cable by a slacked length, without experiencing ineffective tensioning stroke.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A self-adjustable cable tensioning device for a parking brake of a motor vehicle, the device comprising:

a mounting bracket fastened to a body of the motor vehicle and having an engaging pin;

a hand lever pivotally mounted to the mounting bracket in such a way as to be moved between a brake-applied position and a brake-released position;

a detaining plate secured to a side of the hand lever;

a rotating plate fitted around the detaining plate in a manner such that the rotating plate can be rotated along with or independently of the detaining plate, the rotating plate having integrated therewith a cable guide bracket, the detaining plate and the rotating plate cooperating with each other to define therebetween a plurality of actuating chambers which are spaced apart one from another by a predetermined angle and each of which is gradually narrowed in a clockwise direction;

a plurality of rollers inserted into the plurality of actuating chambers in a manner such that the rollers can be locked into and unlocked from narrowed parts of the actuating chambers, respectively, the rollers having a predetermined diameter;

an actuating plate for locking and unlocking the rollers into and from the narrowed parts of the actuating chambers, the actuating plate being engaged with the engaging pin of the mounting bracket immediately before the hand lever reaches the brake-released position, thereby to allow the rollers to be unlocked from the narrowed parts;

a spring for biasing the actuating plate in the clockwise direction; and a take-up spring for biasing the cable guide bracket which is integrated with the rotating plate, in a counterclockwise direction.

* * * * *